United States Patent [19]
Hung et al.

[11] Patent Number: 5,453,325
[45] Date of Patent: Sep. 26, 1995

[54] NONLINEAR OPTICAL WAVEGUIDE MULTILAYER STRUCTURE

[75] Inventors: Liang-Sun Hung, Webster; John A. Agostinelli, Rochester; Jose M. Mir, Rochester; Dilip K. Chatterjee, Rochester, all of N.Y.

[73] Assignee: Eastman Kodak Company, Rochester, N.Y.

[21] Appl. No.: 164,244

[22] Filed: Dec. 9, 1993

[51] Int. Cl.⁶ .................................................. B32B 15/04
[52] U.S. Cl. .................. 428/469; 428/472; 428/697; 428/700; 428/701; 428/702; 428/913; 117/938; 117/948; 365/109; 365/117; 385/130; 385/131
[58] Field of Search .................... 428/469, 471, 428/472, 689, 697, 699, 700, 701, 702, 913; 385/130, 131; 117/913, 938, 948, 950; 365/65, 109, 117, 145

[56] References Cited

U.S. PATENT DOCUMENTS

| | | | |
|---|---|---|---|
| 3,664,867 | 5/1972 | Galli | 428/700 |
| 4,862,414 | 8/1989 | Kuehnle | 428/700 |
| 4,980,339 | 12/1990 | Setsune | 428/699 |
| 5,046,043 | 9/1991 | Miller | 365/145 |
| 5,070,385 | 12/1991 | Evans, Jr. | 365/145 |
| 5,128,316 | 7/1992 | Agostinelli | 428/700 |
| 5,164,808 | 11/1992 | Evans, Jr. | 365/145 |
| 5,191,510 | 3/1993 | Huffman | 365/145 |
| 5,206,829 | 4/1993 | Thakoor | 365/117 |
| 5,338,951 | 8/1994 | Argos, Jr. | 365/145 |

OTHER PUBLICATIONS

"Optical Electrode Design for Integrated Optics Modulators", by D. Marcuse, IEEE Journal of Quantum Electronics, vol. QE–18, 393 (1982).

"First–order Quasi–phase Marched LiNbO₃ Waveguide Periodically Poled by Applying an External Field for Efficient Blue Second–harmonic Generation", by M. Yamada, N. Nada, M. Saitoh and K. Watanabe, Appl. Phys. Lett. 62, 435 (1993).

Primary Examiner—Ellis P. Robinson
Assistant Examiner—Timothy M. Speer
Attorney, Agent, or Firm—Raymond L. Owens

[57] ABSTRACT

A multilayer structure has an a nonlinear optical film epitaxially grown on an underlying buffer layer of substantially lower refractive index. The buffer layer itself is epitaxially grown on a single crystal substrate with an intermediate epitaxial electrode.

11 Claims, 2 Drawing Sheets

NONLINEAR OPTICAL WAVEGUIDE MULTILAYER STRUCTURE

FIELD OF THE INVENTION

The invention relates to an nonlinear optical waveguide multilayer structure.

BACKGROUND OF THE INVENTION

Waveguide modulation is important in the areas of optical communication and high-speed signal processing. Switching and modulation can be accomplished in nonlinear optical waveguides by modifying the propagation constant of a guided mode through the application of an electric field via the linear electrooptic effect. The applied electric field provides a change in refractive index and can result in phase and/or intensity modulation. Voltage is applied to two electrodes placed over or alongside the waveguide. The vertical electric field is employed when one electrode is placed directly over the waveguide, while the horizontal electric field is used when the electrodes are placed on either side of the waveguide. The applied electric field is not uniform and peaks sharply near the electrode edge. See "Optical Electrode Design for Integrated Optics Modulators", by D. Marcuse, IEEE Journal of Quantum Electronics, Vol. QE-18, 393 (1982). The uniformity of the electric field can be improved by moving the two electrodes sufficiently far apart. However, this requirement necessitates a high drive voltage because the magnitude of the field is approximately equal to V/G where G is the electrode gap.

A variety of parametric devices has been developed for efficient frequency conversion. Parametric processes in nonlinear optical materials require phase matching of the interacting optical modes to achieve very efficient nonlinear optical interactions. Periodic inversion of the ferroelectric domain structure of $LiNbO_3$ and $LiTaO_3$ has been used for quasi-phase matching, thus permitting generation of blue light in a guided mode of the waveguide. Yamada et al formed a periodic domain structure in $LiNbO_3$ bulk crystals by applying an external electric field. See "First-order Quasi-phase Matched $LiNbO_3$ Waveguide Periodically Poled by Applying an External Field for Efficient Blue Second-harmonic Generation", by M. Yamada, N. Nada, M. Saitoh, and K. Watanabe, Appl. Phys. Lett. 62, 435 (1993). The field V/T must be greater than the electric coercive force with a value of 20 kV/mm for $LiNbO_3$, where T is the bulk crystal thickness. For instance, voltage level above 4 kV is needed for domain inversion in 200 μm-thick $LiNbO_3$ bulk crystals. For thin films grown on foreign substrates, the electric field is approximately equal to $\epsilon_2 V/\epsilon_1 T$ where $\epsilon_1$ and $\epsilon_2$ are the respective dielectric constants of the film and substrate, and T is the total thickness of the sample. Using the known values of the dielectric constants listed, one can find that voltage with a magnitude of 10.7 kV is required for domain inversion in a c-oriented $LiNbO_3$ film grown on a sapphire substrate with a total thickness of 200 μm. Since higher voltage is required, achieving domain inversion by an electric field is more difficult in thin films than in bulk. Although one can further mill the substrate to reduce the required voltage level, a tradeoff exists between the voltage required for domain inversion and the minimum thickness required for mechanical rigidity.

SUMMARY OF THE INVENTION

In this invention there is provided a multilayer structure comprising in order: an oriented crystalline substrate, an epitaxial electrode on the substrate, an epitaxial buffer layer on the electrode, and an epitaxial upper layer on said buffer layer.

DETAILED DESCRIPTION OF THE INVENTION

An advantage of a multilayer structure in accordance with this invention is that an interior electrode provides a more uniform electrical field and a high electrical field can be applied with relatively low voltage.

This invention describes a multilayer structure using an epitaxial layer as a bottom electrode to grow an optical waveguide on a single crystal substrate. When an electrode is placed on the waveguide surface, the vertical electric field is used with a magnitude of V/G, where G is in the distance between the two electrodes. The field can be sufficiently high at low voltage level because G is in the range of 1–2 μm and can exhibit superior uniformity in the entire area of the waveguide. This structure can also dramatically reduce the voltage necessitated for domain inversion in ferroelectric films. For instance, about 50 V is sufficient for domain inversion. Some surface electrode geometries which utilize fringing fields can also achieve high electric field strengths with low voltages, however, these cannot produce uniform fields over large areas. Such uniform fields are required in some devices, such as prism-type electrooptic scanners.

Figure 1:
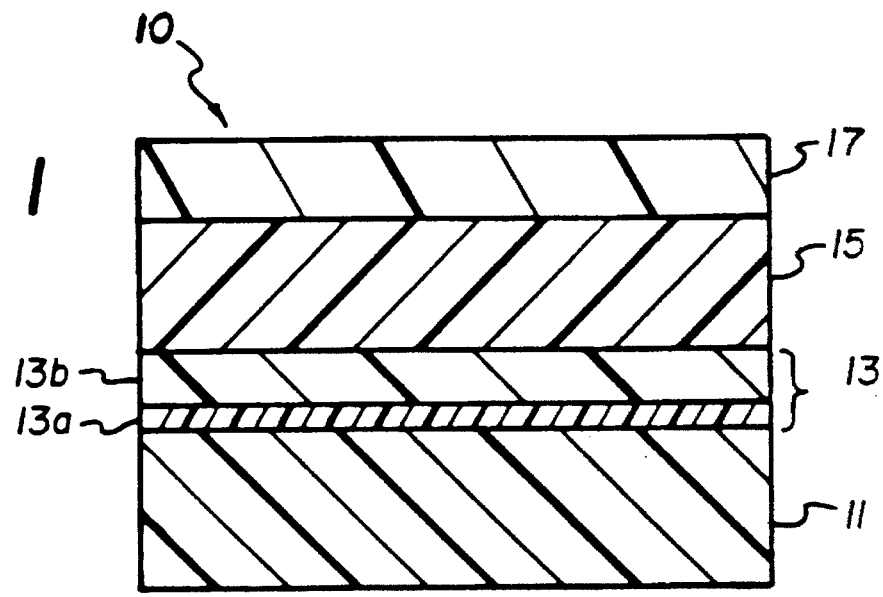
FIG. 1 is a schematic diagram of an embodiment of the multilayer structure according to the invention.
Figure 2:
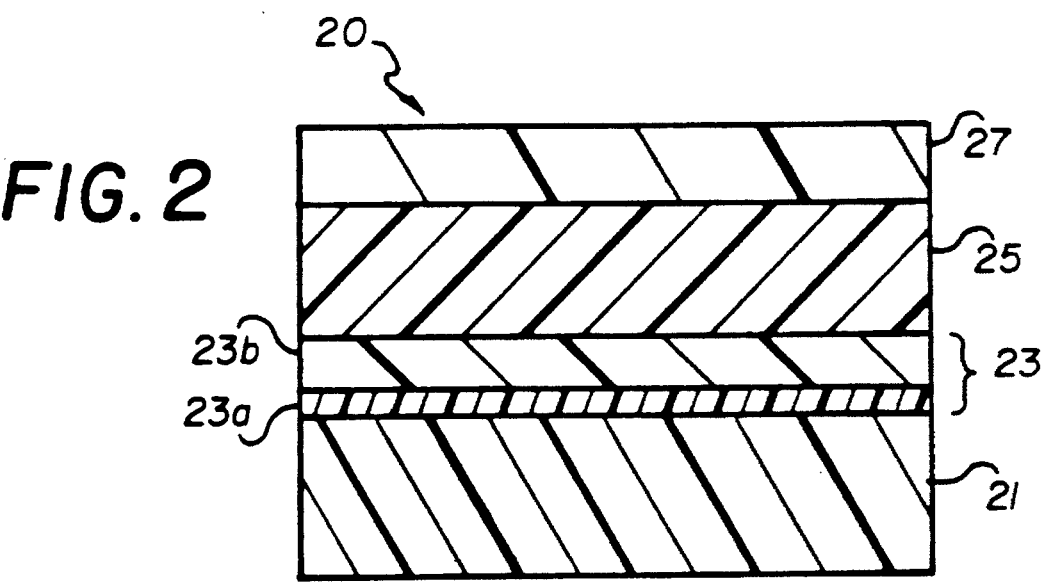
FIG. 2 is a schematic diagram of another embodiment of the multilayer structure of the invention.

Referring to FIG. 1 a multilayer structure 10 includes a single crystalline substrate 11, an epitaxial overlaying electrode 13, a buffer layer 15, and an epitaxial upper layer 17. The electrode consists of an adhesive layer 13a and a conducting layer 13b. Another embodiment of a multilayer structure 20 is shown in FIG. 2. The structure 20 consists of a c-oriented single crystal substrate of $Al_2O_3$ or $LiNb_xTa_{1-x}O_3$ (x=0 to 1) 21, an epitaxial conducting electrode of Pd/Pt 23a & b, an epitaxial buffer layer of (111)-oriented MgO or c-oriented $Mg_4(Nb_xTa_{1-x})_2O_9$ 25, and a c-oriented $LiNb_xTa_{1-x}O_3$ layer 27 grown epitaxially on the buffer layer. The term oriented means that the crystal structure is substantially aligned in one direction.

The substrates are in a preferred c-oriented orientation. Thus the nonlinear optical film may grow epitaxially in this preferred orientation. The substrate can be $Al_2O_3$, $LiNb_xTa_{1-x}O_3$, $Mg_4(Nb_xTa_{1-x})_2O_9$ and MgO, where x is from 0 to 1. However, the same concept can be applied to "x cut" and "y cut" substrates for some applications. The materials used to fabricate the heteroepitaxial structures can be doped, lightly doped or heavily doped, as long as the doping does not significantly alter their crystallinities and optical properties.

The epitaxial electrode 13 in FIG. 1 is an essential part in this invention. This layer must adhere to substrate 11 and buffer layer 15, be stable to oxidation without forming oxides or increasing resistivities upon processing in oxygen, be oriented or preferably a single crystal film with a desired orientation to act as a seed for the growth of epitaxial buffer layer 15, and be inert with respect to substrate 11 and buffer layer 15. These minimum characteristics are mandated of the possible metal choices. Where Pt is used, the adhesion of Pt to the substrate can be improved by depositing an epitaxial adhesive layer of Pd.

The buffer layer 15 has an important contribution to this invention. Preferably, the buffer layer 15 in FIG. 1 is 1) transparent over a wide range of wavelengths, 2) an optical film with a substantially lower refractive index than the nonlinear optical film, and 3) a single crystal film structurally matching the conducting layer and the nonlinear optical film. In addition, the buffer layer must thermally match the multilayer structure so that a relatively thick film can be grown to support low loss waveguides without cracking or peeling. We have found that the oxides MgO and $Mg_4(Nb_xTa_{1-x})_2O_9$ (x=0 to 1) provide excellent buffer layer properties and are most suitable to form waveguides with $LiNbO_3$ and $LiTaO_3$.

The electrode can be grown by many conventional manners, such as e-beam evaporation, laser ablation, sputtering, or chemical vapor deposition. Minimum thickness is about 10 nm for a full coverage. There is no advantage by employing an electrode thicker than 300 nm.

The buffer layer can be grown epitaxially by many conventional manners, such as e-beam evaporation, laser ablation, sputtering, or chemical vapor deposition. It is necessary that the buffer attains a sufficient thickness, so that the strength of the evanescent tail of the mode propagating in the nonlinear optical film is negligible at the electrode-buffer layer interface to prevent guided wave loss. Useful thicknesses range from 200 to 3000 nm, preferably 400 to 800 nm.

The overlying nonlinear optical layer of $LiNb_xTa_{1-x}O_3$ can be grown by any conventional methods, such as rf-sputtering, laser ablation or metal organic chemical vapor deposition. Thickness ranges from 60 to 3000 nm, preferably 200 to 800 nm.

EXPERIMENTAL DETAILS

C-oriented $Al_2O_3$ wafers were used as substrates for epitaxial growth of the multilayer structure. After a conventional cleaning in toluene, 2-propanol, and deionized water, $Al_2O_3$ was annealed in air at 1200° C. for 1 hour prior to being loaded in a chamber for deposition.

Pd, Pt and MgO were sequentially deposited directly on $Al_2O_3$ by electron-beam evaporation. The deposition process was carried out at $3\times10^{-8}$ Torr. The substrate was heated by a radiative heater consisting of tantalum wires. The deposition was carried out at 400° C.–550° C. and at 0.05–0.15 nm/s With a total thickness of 4, 40, and 500 nm for Pd, Pt, and MgO, respectively.

The targets used in laser ablation for $LiTaO_3$ were prepared from powders using calcined $Li_2CO_3$ and $Ta_2O_5$ having a mole ratio of 1.10:1.00. The samples were pelletized under a pressure of 5000 psi, and sintered in air.

$LiTaO_3$ films were grown on the structure of $Al_2O_3$/Pd/Pt/MgO by pulsed laser ablation. A laser pulse energy of 300–360 mJ with a 30 ns duration and a pulse rate of 4 Hz was generated by a KrF excimer laser. The beam was focused to a 5 mm$^2$ spot onto a target of polycrystalline $LiTaO_3$. The substrate was located 6 cm from the target and heated to 560°–650° C. by a resistive heater. The temperature was monitored by a thermocouple attached to an inner wall of the heater block. The deposition was carried out at a rate of 0.06 nm/pulse under an oxygen pressure of 100 mTorr. After 4000–6000 pulses the oxygen pressure was raised to 150 Torr, and the sample was cooled to room temperature.

The samples were characterized by x-ray diffraction. The distribution of c-axis orientations relative to the normal of the substrate surface was determined by x-ray rocking curve analysis, and the feature of in-plane orientation was examined by x-ray pole figure analysis. These techniques are well known and are illustrated by B. D. Cullity, Elements of X-ray Diffraction (Addison-Wesley, Reading, Mass.). The following examples are presented for a further understanding of the invention.

EXAMPLE 1

Thin films of 4 nm thick Pd, 40 nm thick Pt, and 500 nm thick MgO were sequentially deposited on a c-oriented $Al_2O_3$ substrate at 400° C. by e-beam evaporation, and a layer of $LiTaO_3$ with a thickness of 250 nm was then deposited on the MgO coated substrate at 650° C. by laser ablation.

Figure 3:
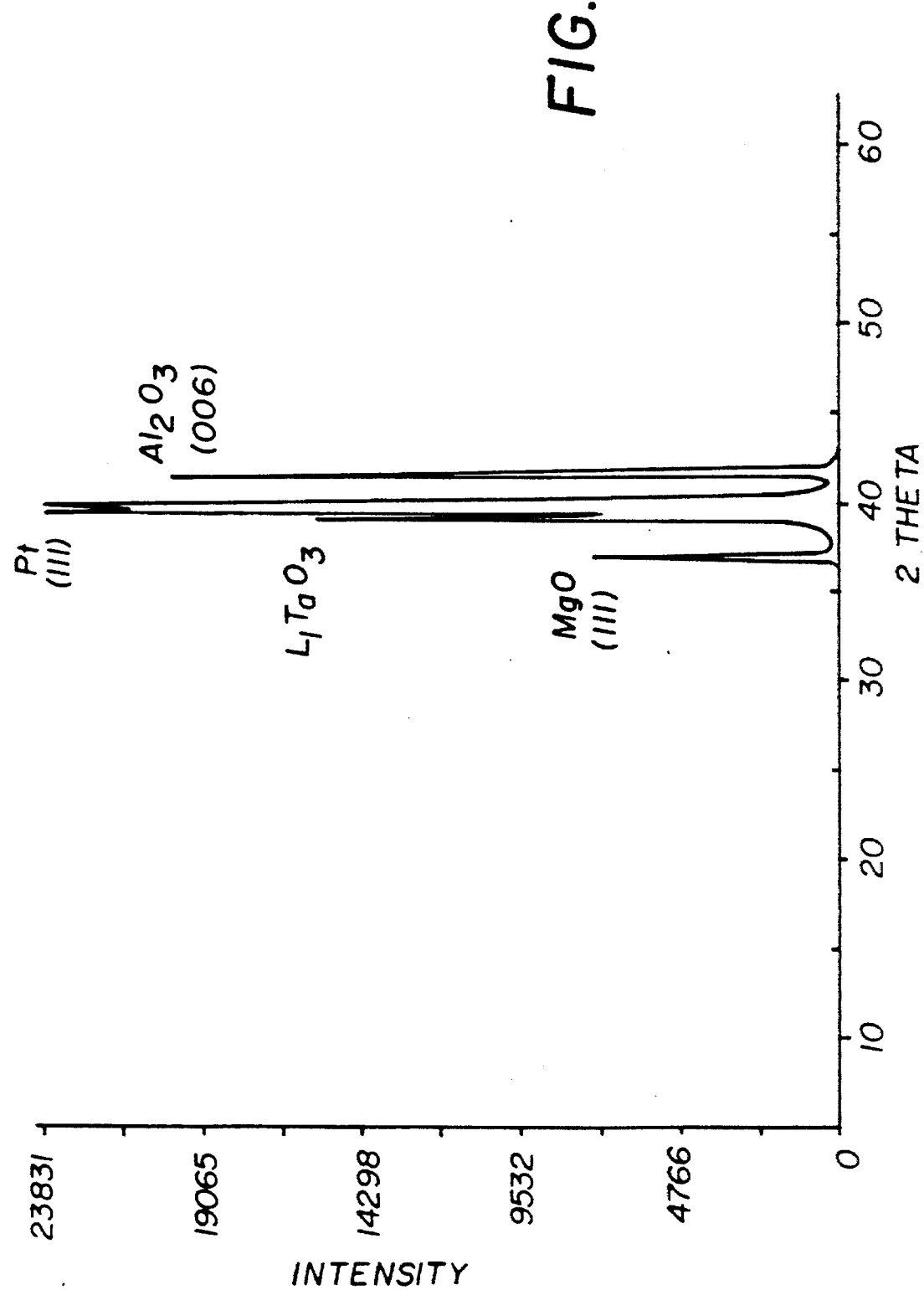
FIG. 3 shows a x-ray diffraction pattern of a heteroepitaxial structure of c-oriented $Al_2O_3$/Pd/Pt/MgO/$LiTaO_3$.

The sample surface was shiny and smooth. The standard 2-theta diffraction pattern in FIG. 3 taken from the multilayer structure shows only the $Al_2O_3$(006), Pt(111), MgO(111) and $LiTaO_3$(006) diffraction peaks. The full width of the rocking curves at half maximum (FWHM) was determined to be about 0.2° for $Al_2O_3$(006), 0.4° for Pt (111), 0.8° for MgO(111), and 0.8° for $LiTaO_3$(006). The good crystal quality of the $LiTaO_3$ film was verified by ion channeling analysis showing a minimum yield of about 0.25. Pole figure analysis indicates a good in-plane alignment of $LiTaO_3$ and $Al_2O_3$ although the $LiTaO_3$ film contained high twin density. The c-oriented $Al_2O_3$/Pd/Pt/MgO/$LiTaO_3$ was optically characterized by m-line spectroscopic measurements and guided optical waves were found in the $LiTaO_3$ film.

EXAMPLE 2

Thin films of 4 nm thick Ti, 40 nm thick Au, and 500 nm thick MgO were sequentially deposited on a c-oriented $LiTaO_3$ substrate at 400° C. by e-beam evaporation, and a layer of $LiTaO_3$ with a thickness of 250 nm was then deposited on the MgO coated substrate at 560° C. by laser ablation. The sample surface was shiny and smooth. The standard 2-theta diffraction pattern taken from the multilayer structure shows only the Au(111), MgO(111), and $LiTaO_3$(006) diffraction peaks. Guided optical waves were found in the $LiTaO_3$ film by optical measurements. The results indicate a nonlinear waveguide epitaxially grown on an electrode consisting of a Ti adhesive layer and an Au conducting layer.

EXAMPLE 3

The same multilayer structure was prepared as described in Example 1, except LiF was used to replace MgO as an epitaxial buffer layer. LiF and MgO posses the same NaCl structure with close lattice constants (a=4.0173 for LiF and 4.2112 for MgO), and have substantially low refractive indices with respect to $LiTaO_3$ (n=1.392 for LiF and 1.736 for MgO). LiF was deposited on $Al_2O_3$/Pd/Pt at 300°–400° C. in vacuum by e-beam evaporation. X-ray diffraction analysis shows two peaks that can be identified as the (111) and (200) lines of LiF. The ratio of the x-ray intensity of the (200) peak to that of the (111) peak is about 6:1, indicating that LiF can not grow epitaxially in a preferred (111)

orientation and is not suitable for acting as a buffer layer to grow c-oriented LiTaO$_3$.

The invention has been described in detail with particular reference to certain preferred embodiments thereof, but it will be understood that variations and modifications can be effected within the spirit and scope of the invention.

PARTS LIST 10 multilayer
11 crystalline substrate
13 overlying electrode
13*a* adhesive layer
13*b* conducting layer
15 buffer layer
17 epitaxial upper layer
20 multilayer structure
21 c-oriented single crystal
23 Pd/Pt electrode
25 buffer layer
27 nonlinear optical film

What is claimed:

1. A multilayer waveguide structure comprising in order: a single crystal substrate, an epitaxial electrode formed on the single crystal substrate, an epitaxial buffer layer formed on the electrode, and an epitaxial upper layer formed on said buffer layer, wherein the electrode includes a single crystal adhesive layer formed on the single crystal substrate and a single crystal oxidation stable conducting layer formed on the adhesive layer.

2. The multilayer waveguide structure of claim 1 wherein said substrate is an oxide selected from the group consisting of Al$_2$O$_3$, LiTa$_x$Nb$_{1-x}$O$_3$, Mg$_4$(Ta$_x$Nb$_{1-x}$)$_2$O$_9$, and MgO, where x is from 0 to 1.

3. The multilayer waveguide structure of claim 1 wherein said adhesive layer includes materials selected from the group consisting of Pd, Cr, Ti, and Zr.

4. The multilayer waveguide structure of claim 1 wherein said conducting layer includes materials selected from Pt, Au, and Ag.

5. The multilayer waveguide structure of claim 4 wherein said buffer layer includes a material selected from the group consisting of MgO, Al$_2$O$_3$, Ga$_2$O$_3$, LiTa$_x$Nb$_{1-x}$O$_3$, and Mg$_4$(Ta$_x$Nb$_{1-x}$)$_2$O$_9$, where x is from 0 to 1.

6. The multilayer waveguide structure of claim 5 wherein said epitaxial upper layer comprises LiTa$_x$Nb$_{1-x}$O$_3$, wherein x is from 0 to 1.

7. The multilayer waveguide structure of claim 1, wherein the single crystal adhesive layer includes Pd and the single crystal oxidation stable conducting layer includes Pt.

8. The multilayer waveguide structure of claim 1 wherein said buffer layer includes a metal oxide.

9. The multilayer waveguide structure of claim 8 wherein said epitaxial upper layer is a nonlinear optical oxide.

10. The multilayer waveguide structure of claim 1 wherein said epitaxial upper layer is a metal oxide.

11. The multilayer waveguide structure of claim 1 wherein said substrate is z cut, or x cut, or y cut.

* * * * *